Feb. 6, 1968   S. B. SILVERSCHOTZ   3,367,233
STORE SUSPENSION AND RELEASE SYSTEM
Filed Dec. 30, 1965
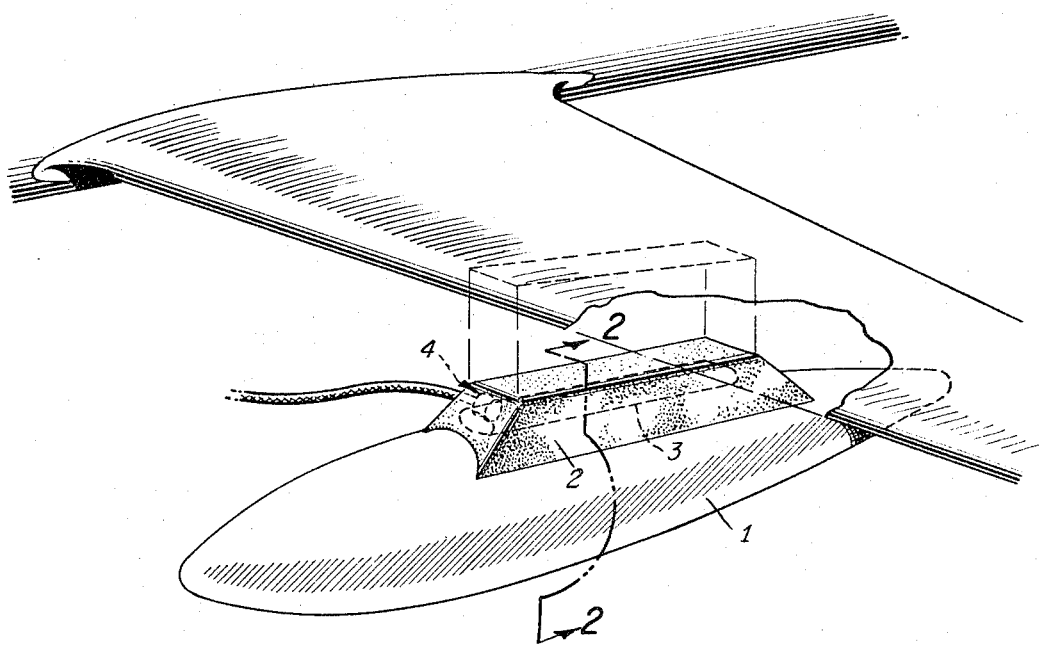
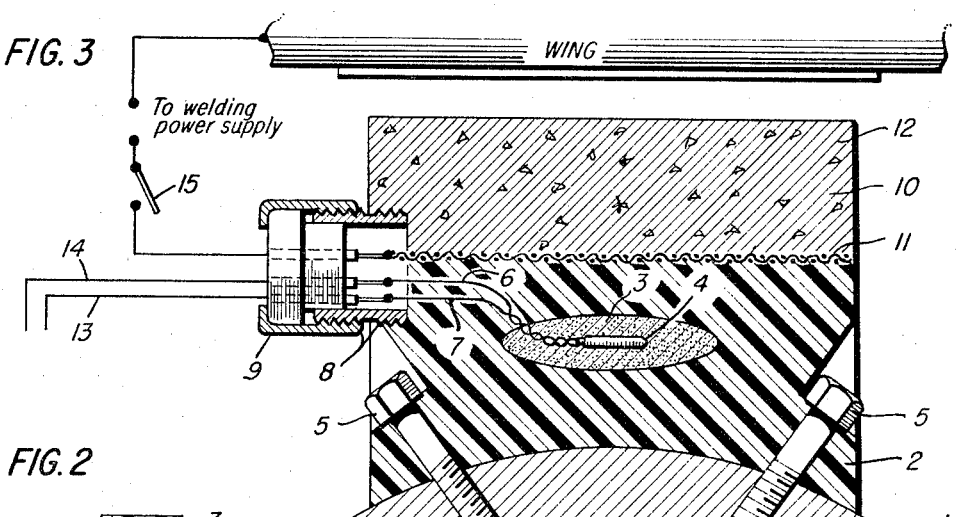
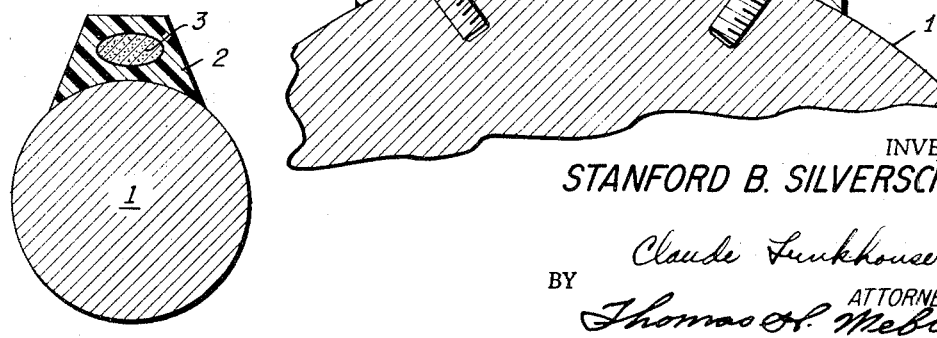
INVENTOR
STANFORD B. SILVERSCHOTZ

United States Patent Office 3,367,233
Patented Feb. 6, 1968

3,367,233
STORE SUSPENSION AND RELEASE SYSTEM
Stanford B. Silverschotz, Livingston, N.J., assignor, by mesne assignments, to the United States of America as represented by the Secretary of the Navy
Filed Dec. 30, 1965, Ser. No. 517,859
9 Claims. (Cl. 89—1.5)

ABSTRACT OF THE DISCLOSURE

A method and apparatus for affixing and releasing wing mounted stores shaped to meet the aerodynamic requirements of the store and the wing and having a highly conductive portion with associated electrical circuitry, a less conductive portion, and a non-conducting portion containing an explosive surrounded by a detonator. The store on which the apparatus is mounted is attached to the wing by welding and released by detonating the charge to thereby sever the store from the apparatus.

---

The instant invention is directed to a novel method and apparatus for rapidly affixing wing mounted type stores onto an aircraft. More particularly the invention relates to an improved technique which utilizes an aerodynamically shaped suspension member disposed between the store and the attaching surface of an aircraft. The attachment is accomplished in a maner whereby the member is adapted to be severed upon the application of an electrical current to an electrically initiated explosive charge disposed within the plastic portion of the suspension member.

The suspension structure includes a member which is of electrically conductive plastic and which is further electrically welded to a mounting plate, preferably on the wing structure of the aircraft. Release of the load is accomplished by virtue of the inclusion of a detonator for the aforemensioned explosive charge in the suspension member. The charge is detonated to sever the mounting member and thereby split away the load and a portion of the plastic suspension member.

Prior art store suspension systems for use with aircraft have in general been characterized by mechanical latch type apparatus for engaging the store prior to release and for providing release at the desired time therefore by either electrical or mechanical mechanisms for accomplishing disengagement of the latches. U.S. Patent No. 2,889,746, which issued to L. H. Glassman et al., on June 9, 1959, teaches the utilization of an explosive bolt type store suspension and release device for aircraft in which severance is occasioned by the application of an electric current to a charge in the bolt which in turn provides for release of the store.

The instant invention provides a rapid attaching method and apparatus for arming aircraft with wing mounted stores. The apparatus permits of a greater degree of simplicity in both loading and release actuating than store suspensions and release systems heretofore or now in present use. The body of an airborne load such for example as a fuel tank, bomb or rocket is arranged to carry a fabricated piece of electrically conductive plastic which is shaped to meet aerodynamic requirements and coincide with the configuration of the mating portion of the aircraft. This member in turn is comprised of a highly conductive portion, a less conductive portion and non-conducting portion. By virtue of this arrangement within the attachment member the store is ultimately attached to the aircraft by a thermal bond of plastic adhesive or epoxy. Preferably the mounting piece is of a thermoplastic which is electrically welded to the wing structure.

It is a feature of the instant invention to provide an improved store suspension system attachment and release method together with apparatus for utilization with an aircraft, in which the store may be rapidly attached to an aircraft with minimum of structure.

One object of the instant invention resides in the provision of store suspension and release system which requires no mechanisms nor moving parts of either an electrical or mechanical nature for the connecting means utilized for attachment of the store to the suspension and in which the complexity of the attachment of the store mounting structure to the undersurface structure such as the wings of an aircraft is reduced to a minimum.

Other objects, advantages and novel features of the invention will become apparent from the following detailed description of the invention when considered in conjunction with the accompanying drawings wherein:

FIG. 1 is a perspective view of a store and a store suspension assembly of the instant invention;

FIG. 2 is a cross-sectional view in elevation taken along the line 2—2 of FIG. 1; and FIG. 3 is an enlarged fragmentary view in vertical section of further details of the suspension member and further indicating in diagrammatic form, the electrical circuitry associated therewith for attachment of and actuation of the release of the store.

Referring now to FIG. 1 there is shown a store or load 1, which may be in the nature of a bomb or any other store desired to be released from an aircraft in flight. The suspension is indicated generally at 2, and provided with a chamber 3, for reception of an explosive charge and a detonator 4, as indicated in FIG. 2 and FIG. 3.

Referring now to FIG. 3, the store suspension structural member 2, is shown as attached to the store by means of machine bolts 5, or any other suitable fastening device. The electrical connections for detonation of the charge at 3, by the detonator 4, contained within the member 2, is accomplished by a provision of a pair of conductors 6 and 7, which are brought out through a severable cable connector 8, the cap or plug portion 9 of which is provided with a plurality of leads for connections with leads 13 and 14 to circuitry (not shown) and disposed within the aircraft for electrical initiation of the detonator 4. It also provides for external connections to a welding power supply for heating the store mounting structure during the attachment operations. The lower portion at 2, of the store member is a solid member, whereas the uppermost plastic portion of the member at 10 and 12, is metal filled to render the thermoplastic conductive. It is fabricated in a sandwich like form to include a wire mesh at 11 which is disposed at the interface between the plastic and the solid portion of the member. The wire mesh 11 is connected through the cable connector parts 8 and 9 to the welding power supply. The return path of the power supply is connected to the wing of the aircraft.

When the switch 15 is closed and the store is in engagement with the wing surface the circuit is completed for the welding operation. The portion at 12 is less conductive than the portion at 10 and adjacent wire mesh 11 by virtue of a less dense concentration of metal particles at the portion 12.

In this regard, a conventional heater may be installed in the wing mounting plate as an emergency release device and as a means for releasing residual plastic on the mounting plate after detonation of the explosive.

Obviously many modifications and variations of the present invention are possible in the light of the above teachings. It is therefore to be understood that within the scope of the appended claims the invention may be practiced otherwise than as specifically described.

What is claimed is:

1. An airborne store attachment and relase apparatus of the character described for attachment to an under surface of an aircraft, comprising:

a plastic body member having an upper surface configured to mateably engage an under surface portion of an airborne vehicle and a lower surface configured for mating engagement with a store, bomb, missile or the like;

release means including an explosive charge disposed within said body member and of a magnitude sufficient only to effect severance of said store from the airborne vehicle; and a thermo responsive electrically energizable means disposed substantially within said plastic body member for effecting attachment of said body member at least with a mately configured portion of an airborne vehicle.

2. The apparatus of claim 1 wherein said thermo responsive means comprises a loading of the plastic body member material with electroconductive metallic powder particles.

3. The apparatus of claim 2 further characterized by the loading of said plastic body member material being of differing density and concentration of metallic powder particles so disposed as to provide a first zone of highest electroconductivity in adjacency to a second zone of lesser electroconductivity and to a third zone of material displaying insulating characteristics.

4. The apparatus of claim 3 further including electrode means disposed at the interface between said nonconductive zone of said body material and said zone of highest electroconductivity; and means for connection of said electrode means to an external energization circuit for application of power thereto.

5. The method of attaching to the metallic surface of an air vehicle a fusible plastic body member having an upper surface configured to mateably engage an under surface portion of an airborne vehicle and a lower surface configured for mating engagement with a store, bomb or missile; release means including an explosive charge disposed within said plastic body member and of a magnitude sufficient only to effect severance of said store from the airborne vehicle; and a thermo responsive electrically energizable means disposed substantially within said plastic body member for effecting attachment of said body member at least with a mately configured portion of an airborne vehicle comprising the steps of:

placing the fusible plastic body into electrical contacting relationship with the air vehicle; and energizing an electrical circuit there through only for a sufficient period of time to effect a thermal bond between said fusible plastic body and/or air vehicle.

6. The method of releasing a store from an air vehicle utilizing an explosive charge and attached by the method of claim 5 comprising the further step of:

energizing an electrical circuit for detonating actuation of said explosive charge thereby to effect severance of said store and a portion of said fusible plastic body.

7. The method of claim 6 further comprising the step of releasing the portion of said fusible plastic body remaining after release of said store by the additional step of:

applying heat to the portion of the air vehicle to which said remaining body portion is attached, and of a magnitude sufficient only to effect said release of said remaining body portion.

8. The method of releasing a store having a fusible plastic body attached to an air vehicle by the method of claim 5 which comprises the additional step of:

applying heat to the portion of the air vehicle to which said body portion is attached, and of a magnitude sufficient only to effect release of said store and the body portion attached thereto.

9. The step of attempting release of a store by the method of claim 6, and in the event of malfunction or failure to effect the desired release, accomplishing release by applying heat to the portion of the air vehicle to which said body portion is attached, and of a magnitude sufficient only to effect release of said store and the body portion attached thereto.

No references cited.

SAMUEL W. ENGLE, *Primary Examiner.*